United States Patent
Paul

[11] 3,861,676
[45] Jan. 21, 1975

[54] DISCONNECTABLE TRAINING DEVICE FOR SPORTS SUCH AS JUJITSU, JUDO, OR KARATE

[76] Inventor: Richard Paul, Eichendorffstr. 7, 5202 St. Augustin Sieg 1, Germany

[22] Filed: Feb. 23, 1973

[21] Appl. No.: 335,350

[30] Foreign Application Priority Data
Mar. 2, 1972  Germany............................ 2209988

[52] U.S. Cl. ............................................... 272/76
[51] Int. Cl. .......................................... A63b 69/00
[58] Field of Search................ 272/76; 35/17, 29 R; 46/32, 161; 223/66

[56] References Cited
UNITED STATES PATENTS

| | | | |
|---|---|---|---|
| 419,285 | 1/1890 | Sanborn................................. | 272/76 |
| 1,099,417 | 6/1914 | Armstrong............................. | 272/76 |
| 1,250,905 | 12/1917 | Liljegran............................ | 272/76 X |
| 1,279,615 | 9/1918 | VanMeter......................... | 46/32 UX |
| 1,716,678 | 6/1929 | Attanasio............................... | 272/76 |
| 2,483,034 | 9/1949 | Braeg....................................... | 35/17 |
| 2,909,370 | 10/1959 | Fortney................................. | 272/76 |
| 3,277,601 | 10/1966 | Ryan...................................... | 46/161 |

FOREIGN PATENTS OR APPLICATIONS
600,059  3/1948  Great Britain......................... 272/76

Primary Examiner—Richard C. Pinkham
Assistant Examiner—R. T. Stouffer
Attorney, Agent, or Firm—Walter Becker

[57] ABSTRACT

A training device for sports such as jujitsu, judo, and karate having the shape, size and outline of a human being, in which the body of the device consists of a yieldable elastic material, preferably rubber or synthetic material. The body has its feet held on a plate by a snap button-like connection in the form of complementary male and female members, so that the body will be disconnected from the plate upon application of sufficient force to lift the body from the plate.

1 Claim, 2 Drawing Figures

DISCONNECTABLE TRAINING DEVICE FOR SPORTS SUCH AS JUJITSU, JUDO, OR KARATE

The present invention relates to a training device having the shape and size of a human being. Various training devices are known by means of which at home and in sporting clubs a body building can be effected. These devices usually have the character of a machine and thus have a non-personal effect upon the person training with such device. This has in particular with sporting clubs interested in fighting sports such as jujitsu, judo and karate resulted in a drop in interest in this type of sport.

It is, therefore, an object of the present invention to provide a training device for the above mentioned types of sports which will establish a closer relationship for the person using the device with a prospective adversary and by means of which the training person can more fully use his techniques.

These and other objects and advantages of the invention will appear more clearly from the following specification in connection with the accompanying drawing, in which.

The training device according to the present invention, which has the shape and size of a human being, is characterized primarily in that the body consists of a yieldable material, preferably synthetic material or rubber, and with its feet is held on a plate by means of a snap button-like connection.

In order to give the training person the possibility to adopt a position corresponding to various positions of the imaginary adversary, it is suggested according to the present invention that the arms in the shoulder sections are held by means of joints and can be adjusted at will. In conformity with the invention, the snap button-like connection of the body to the bottom plate may be reinforced by springs in the legs.

Figure 1:
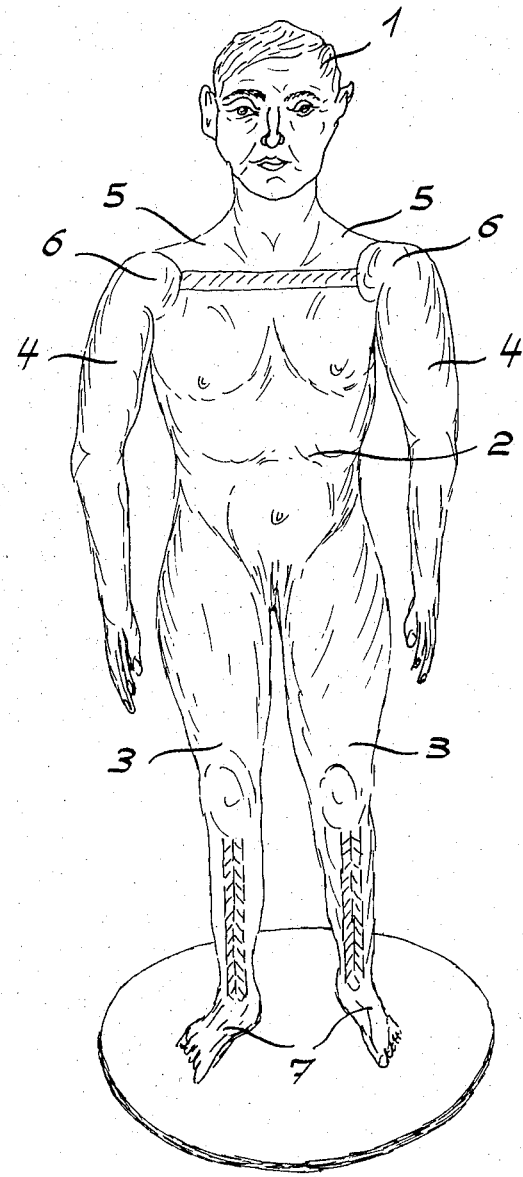
FIG. 1 illustrates the front view of the training device according to the invention.
Figure 2:
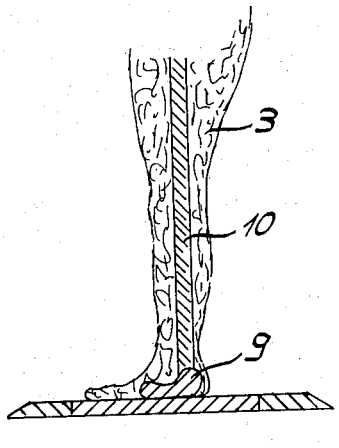
FIG. 2 is a section through the connection of the training device with a bottom plate.

Referring now to the drawing in detail, the training device illustrated has the shape and size of a human being and with regard to head 1, shoulder portions 5, stomach and hip portion 2 and legs 3 forms a closed unit. The arms 4 are within the region of the shoulder sections 5 held through joints 6 and therefore are adjustable at will. The body is by means of its feet 7 held on a bottom plate 8, and more specifically, through the intervention of snap buttom-like holding members 9 (FIG. 2) in the form of complementary male and female members, so that the body will be disconnected from the plate upon application of sufficient force to lift the body from the plate. These holding means 9 may additionally be loaded by springs so as to increase their effect. The advantages realized by the device according to the invention consist primarily in that during the training, a direct connection of the trainee is established with the imaginary adversary and the training can be carried out while using the full force of the trainee. The yieldability of the training body in connection with any desired adjustment of the arms increases this effect. The snap button-like connection of the training body with the bottom plate permits a throwing over of the training person so that the training person can develop a genuine feeling for the throwing over of the imaginary adversary. The simple construction of the training device not only permits a training in a sporting hall or in a sporting club, but also permits a training at home.

It is, of course, to be understood that the training device according to the present invention is not limited to the specific showing in the drawing but also comprises any modifications within the scope of the appended claims.

What I claim is:

1. A training device for sports such as jujitsu, judo, and karate, in which gripping and close contact engagement of simulated form is important, said device having the shape and size of a human being and formed of a body of elastomeric material including legs and feet integral with said body and separate arms of elastomeric material joined at the shoulders to said body and positionable selectively in different positions, and a base plate for supporting said body, said feet and base plate having means releasably connecting said legs to said base plate, said means comprising a pair of complementary male and female members releasable interengaged on each foot and on said base plate, one of said members of each pair being formed on said base plate and the other of said members being formed on each foot, so that said body will be disconnected from said plate upon application of sufficient force to lift said body from said plate, and springs extending upwardly longitudinally in said legs from said means connecting said legs to said plate.

\* \* \* \* \*